United States Patent
Li et al.

(10) Patent No.: US 9,294,909 B2
(45) Date of Patent: Mar. 22, 2016

(54) CHANGE OF MOBILE COMMUNICATION SYSTEM USING RESELECTION OF PREFERRED SYSTEM

(71) Applicant: Telefonaktiebolaget L M Ericsson (publ), Stockholm (SE)

(72) Inventors: Qiang Li, Täby (SE); Justus Petersson, Hässelby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 41 days.

(21) Appl. No.: 14/114,364

(22) PCT Filed: Jun. 28, 2013

(86) PCT No.: PCT/SE2013/050817
§ 371 (c)(1),
(2) Date: Oct. 28, 2013

(87) PCT Pub. No.: WO2014/209186
PCT Pub. Date: Dec. 31, 2014

(65) Prior Publication Data
US 2015/0126190 A1      May 7, 2015

(51) Int. Cl.
*H04W 36/14* (2009.01)
*H04W 36/00* (2009.01)
*H04W 8/20* (2009.01)
*H04W 48/18* (2009.01)

(52) U.S. Cl.
CPC .............. *H04W 8/205* (2013.01); *H04W 48/18* (2013.01)

(58) Field of Classification Search
CPC ....... H04W 88/06; H04W 48/18; H04W 8/18; H04W 36/14; H04W 36/0083
See application file for complete search history.

(56) References Cited

U.S. PATENT DOCUMENTS

2013/0281085 A1* 10/2013 Sen .................. H04W 48/18
455/426.1

FOREIGN PATENT DOCUMENTS

| FI | WO 2012143049 A1 * | 10/2012 | ............ H04W 8/183 |
|---|---|---|---|
| WO | WO-02/067563 | 8/2002 | |
| WO | WO-2004/066663 | 8/2004 | |
| WO | WO-2008/114233 | 9/2008 | |
| WO | WO-2009/135991 | 11/2009 | |
| WO | WO-2011/036484 | 3/2011 | |

(Continued)

OTHER PUBLICATIONS

"Embedded SIM Task Force Requirements and Use Cases", 1.0, GSM Association, Feb. 21, 2011, 38 pages.
"Smart Cards; Embedded UICC; Requirements Specification", Draft ETSI TS 103 383 V<0.0.6> (May 2011), 20 pages.

(Continued)

*Primary Examiner* — Chuong A Ngo
(74) *Attorney, Agent, or Firm* — Nicholson De Vos Webster & Elliott LLP

(57) ABSTRACT

A mobile terminal is control to change from being attached to a first mobile communication system to being attached to a second mobile communication system, through an update of a list of preferred mobile communication systems for the mobile terminal, according to which update the second mobile communication system has a higher rank than the first mobile communication system. The mobile terminal receives the update via the first mobile communication system and changes from being attached to the first mobile communication system to being attached to the second mobile communication system based on the updated list.

25 Claims, 4 Drawing Sheets

(56) References Cited

FOREIGN PATENT DOCUMENTS

| WO | WO-2012/143049 | 10/2012 |
| WO | WO 2012143049 A1 * | 10/2012 |

OTHER PUBLICATIONS

International Search Report, Application No. PCT/SE2013/050817, Mar. 7, 2014, 13 pages.
Written Opinion for Application No. PCT/SE2013/050817, mailed Jul. 1, 2015, 8 pages.

* cited by examiner

CHANGE OF MOBILE COMMUNICATION SYSTEM USING RESELECTION OF PREFERRED SYSTEM

CROSS-REFERENCE TO RELATED APPLICATIONS

This application is a National stage of International Application No. PCT/SE2013/050817, filed Jun. 28, 2013, which are hereby incorporated by reference.

TECHNICAL FIELD

The invention relates to mobile communication systems. More particularly, the invention relates to a mobile communication system changing arrangement for at least one mobile communication system and a method for changing mobile communication system, a mobile terminal for communication with at least one mobile communication system and a method of changing communication from a first mobile communication system to a second mobile communication system.

BACKGROUND

Mobile communication systems where mobile terminals, often termed user equipment, communicate wirelessly have become more and more popular.

Mobile communication systems, such as public land mobile systems are operated by Operators. There may in geographical areas, such as in a country, exist a number of different operators.

At the same time it is today not uncommon that mobile terminals are involved in data communication without user involvement, often referred to as machine-machine communication. A mobile terminal may thus be provided in a machine, such as a car and communicate with other machines via the mobile communication system.

The mobile terminal may in this case also be owned by a company. Such a company may not want the mobile terminal to be too tightly linked to a specific operator, but may want to change operator or at least have the option of such a change of operator.

Various access rights for the mobile terminal to a mobile communication system is often related to a subscription and a subscriber identity, such as an International Mobile Subscriber Identity (IMSI). The handling of such a subscription on behalf of the mobile terminal is then often carried out with the use of a smart card such as a Subscriber Identity Module (SIM) a Universal Integrated Circuit Card (UICC) or an embedded UICC (eUICC).

In order to change from a first mobile communication system to a second mobile communication system the following steps may have to be performed:
1. The smart card downloads, using the radio circuit of the mobile terminal and the access network of the first mobile communication system, a new subscription remotely from a subscription manager
2. The subscription manager sends a mobile terminated SMS (SMS-MT) to the smart card to enable the new subscription
3. The smart card enables the new subscription, disables old subscription, and switches to the subscription
4. The smart card triggers the mobile terminal to reset
5. the mobile terminal resets and
6. the mobile terminal re-connects to the network with the new subscription using a new IMSI.

Steps 3-5 are often termed "Enabling Subscription Process". As can be seen the mobile terminal has to be reset in order to switch (attach) to the new system. The "Enabling Subscription Process" takes at least 30 seconds to complete with reset of the mobile terminal. Thereafter it takes several seconds to attach to the new mobile communication system with the new subscription. The delay is too long if there is real-time traffic going on with the mobile terminal or if the mobile terminal is not delay-tolerant, and the major reason for the delay is that the mobile terminal needs to reset to switch and attach to the new network.

The delay may for instance be problematic if the mobile terminal is involved in an activity that requires fast communication or if it needs to have the option to issue hazard warnings. Such a delay may thus be unacceptable.

There is therefore a need for an improvement when changing from one subscription to another. There is particularly a need for a change of subscription that is considerable faster than the one described above.

SUMMARY

One object is thus to provide an improvement in the change from a first mobile communication system to a second mobile communication system.

This object is according to a first aspect of the invention achieved by a mobile communication system changing arrangement for at least one mobile communication system. The arrangement comprises a processor and memory. The memory contains computer instructions executable by the processor whereby the mobile communication system changing arrangement is operative to:
control a mobile terminal to change from being attached to a first mobile communication system to being attached to a second mobile communication system. The control is obtained through an update of a list of preferred mobile communication systems for the mobile terminal. According to the update the second mobile communication system has a higher rank than the first mobile communication system.

This object is according to a second aspect also achieved by a method for changing mobile communication system a mobile terminal is to communicate with. The method is performed in a mobile communication system changing arrangement and comprises:
controlling a mobile terminal to change from being attached to a first mobile communication system to being attached to a second mobile communication system. The controlling is obtained through updating a list of preferred mobile communication systems for the mobile terminal. According to the update the second mobile communication system has a higher rank than the first mobile communication system.

The object is according to a third aspect also achieved through a mobile terminal for communication with at least one mobile communication system. The mobile terminal comprises a radio circuit for communicating with a first and a second mobile communication system. The radio circuit is configured to:
receive, via the first mobile communication system, an update of a list of preferred mobile communication systems for the mobile terminal, according to which update a second mobile communication system has a higher rank than the first mobile communication system, and
change from being attached to the first mobile communication system to being attached to the second mobile communication system based on the updated list.

The object is according to a fourth aspect furthermore achieved by a method of changing communication from a first mobile communication system to a second mobile communication system. The method is performed in a mobile terminal and comprises:

receiving, via the first access network, an update of a list of preferred mobile communication systems for the mobile terminal from a mobile communication system changing arrangement, according to which update a second mobile communication system has a higher rank than the first mobile communication system, and changing from being attached to the first mobile communication system to being attached to the second mobile communication system based on the updated list.

The invention according to the above-mentioned aspects has a number of advantages. The change form one system to another is all handled through the use of these mobile communication systems. The mobile terminal may thereby always be on and do not need to be reset. This allows a swift change, without unnecessary loss of data. The change over is also simple in that no manual operation of the mobile terminal is required.

BRIEF DESCRIPTION OF THE DRAWINGS

The invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits and methods are omitted so as not to obscure the description of the invention with unnecessary detail.

Figure 1:
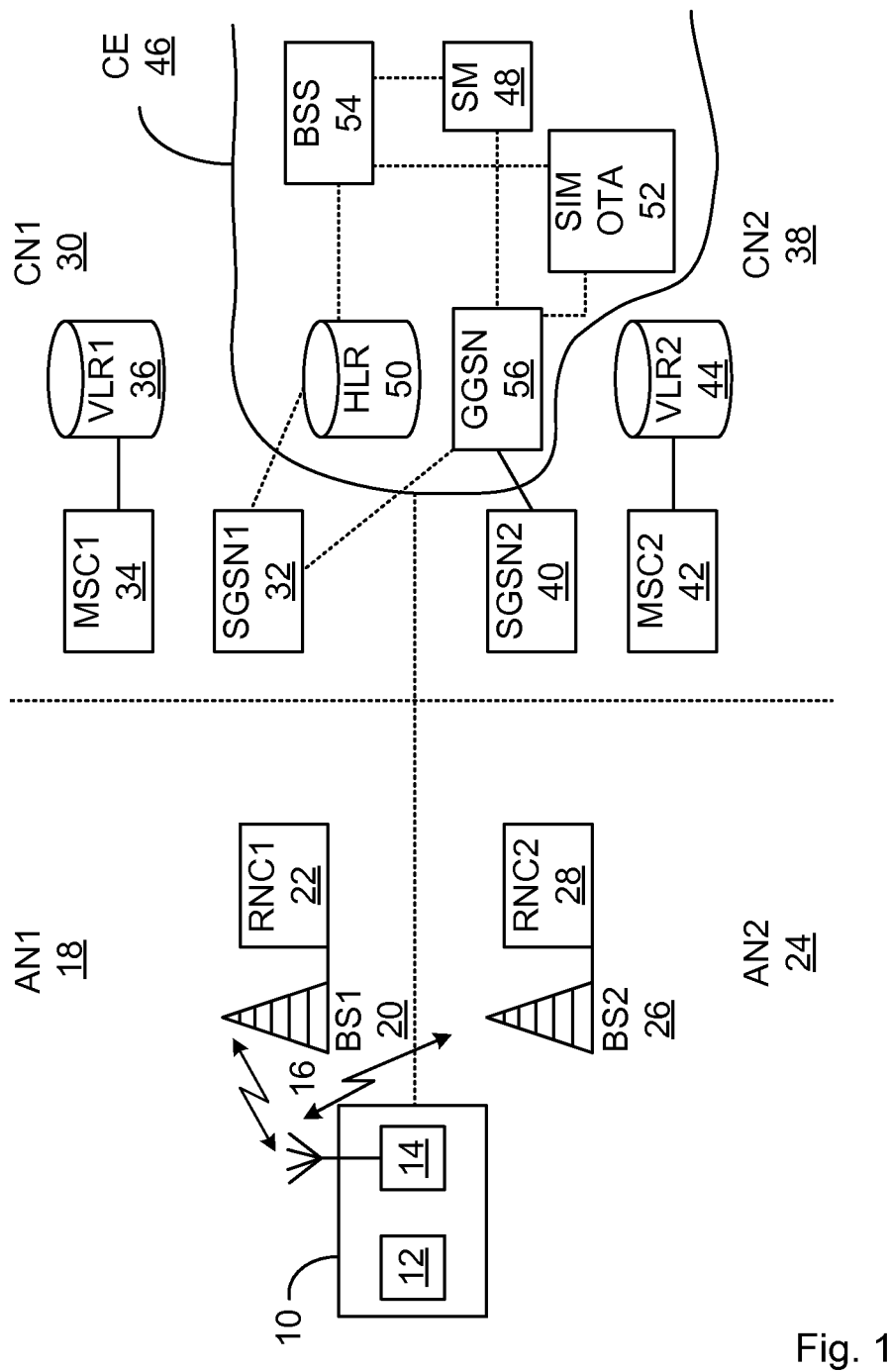
FIG. 1 schematically shows a mobile terminal in contact with two mobile communication systems, where each mobile communication system is divided into an access network and a core network.

In FIG. 1 there is shown a mobile terminal 10 communicating with a first and a second mobile communication system, where each mobile communication system comprises an access network AN1 18 and AN2 24 and a core network CN1 30 and CN2 38.

The mobile terminal comprises a memory module 12 and a radio circuit 14 connected to an antenna 16 in order to communicate with a first base station BS1 20 as well as with a second base station BS2 26. The first base station BS1 20 is a part of the first access network 18 that in turn is associated with a first operator, while the second base station BS2 26 is a part of the second access network AN2 24 that in turn is associated with a second operator.

The first base station 20 is connected to a first radio network controller RNC1 22, while the second base station 26 is connected to a second radio network controller RNC2 28. The first base station 20 and first radio network controller 22 are thus provided in the first access network 18 of the first mobile communication system, while the second base station 26 and second radio network controller 28 are provided in the second access network 24 of the second mobile communication system. In order to simplify the description given of aspects of the invention, these are the only elements of the two access networks being disclosed and described here. It should however be realized that each access network may comprise several more base stations and several more radio network controllers. It should also be realize that in some mobile communication systems there may be no radio network controllers. In this case the access networks may only comprise base stations. Base stations may also be referred to as nodeBs or evolved nodeBs (eNodeB). An access network may also be provided without radio network controller. It may thus solely consist of base stations.

The radio network controller 22 of the first access network 18 communicates with a first core network CN1 30. In this first core network 30 there is a first serving GPRS support node SGSN1 32, where GPRS is an acronym for General Packet Radio Service. There is also a first mobile switching centre MSC1 34 connected to a first visitor location register VLR1 36.

In a similar manner the radio network controller 28 of the second access network 24 communicates with a second core network CN2 38. In this second core network there is a second serving GPRS support node SGSN2 40. There is also a second mobile switching centre MSC2 42 connected to a second visitor location register VLR2 44.

In the core networks there are also a number of further entities. In aspects of the invention these are shared by both the core networks. In both the core networks there is thus a common Home Location Register HLR 50, a common Gateway GPRS Support Node GGSN 56, which are communicating with a business support system BSS 54, a subscription manager SM 48 and a SIM OTA 52. SIM is an acronym of Subscriber Identity Module, which is a type of memory module used in many mobile communication applications. OTA is an acronym of over-the-air. SIM OTA 52 is a unit for remotely programming removable memory modules of mobile terminals over the air. These units are often provided in each core network, but is in some embodiments of the invention a group of common entities 46. They are thus shared by both core networks. This could for instance be the case if the core network functionality of both operators are provided by the same service provider, a core network service provider.

Figure 2:
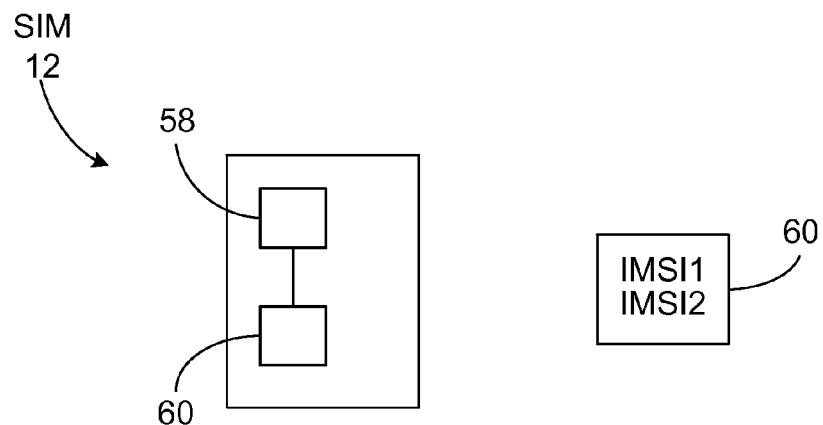
FIG. 2 shows a block schematic of a smart card in the mobile terminal and two subscriber identities on the memory of a smart card.

FIG. 2 schematically shows the memory module 12 of the mobile terminal, which may be a removable memory module. The memory module of the mobile terminal may be a SIM card. In embodiments of the invention it is a so-called smart card and therefore comprises a processor 58 with connected program memory 60. The smart card may for instance be a Universal Integrated Circuit Card (UICC) or an embedded Universal Integrated Circuit card (eUICC). In the memory module 60 there are stored two different subscriber identities, each in the form of an international subscriber identity (IMSI). There is a first subscriber identity IMSI1 and a second subscriber identity IMSI2. The first subscriber identity IMSI1 is associated with the first mobile communication system, while the second subscriber identity IMSI2 is associated with the second mobile communication system. In some embodiments the memory module 60 also comprises computer program code for performing some of the functions of the mobile terminal for changing between the two mobile communication systems. In other embodiments the radio circuit comprises such computer program code. In yet other embodiments both the smart card 12 and the radio circuit 14 comprises such functions.

Figure 3:
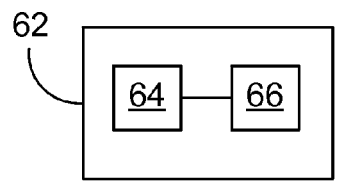
FIG. 3 shows a block schematic of an exemplifying subscription identity changing arrangement comprising a processor and a memory.

FIG. 3 shows a block schematic of one variation of a mobile communication system changing arrangement provided for the two core networks. The arrangement 62 is provided in the form of a server or computer and likewise comprises a processor 64 with associated program memory 66.

Figure 4:
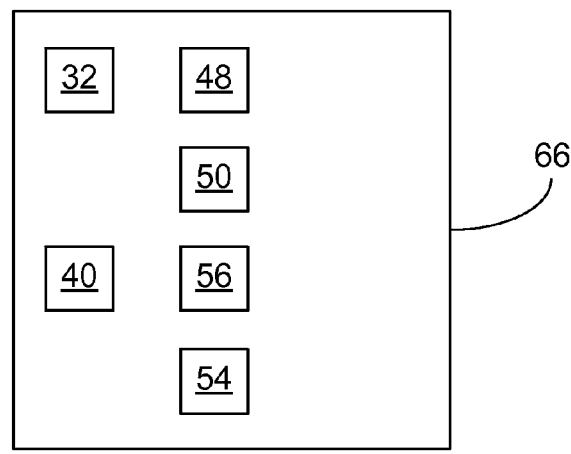
FIG. 4 shows a block schematic of the content of the memory of the arrangement of FIG. 3 with a number of functional blocks.

FIG. 4 shows a block schematic of the memory comprising a number of program modules. In the memory there is a first SGSN module 32, SGSN1, and a second SGSN2 module 40, SGSN2. There is further a subscriber manager module 48, an HLR module 50, a SIM OTA module 52, a BSS module 54 and a GGSN module 56. It can thus be seen that the memory comprises modules for forming the functions of both core networks and particularly for forming common entities. It should be realized that in some embodiments the memory only comprises a HLR module. In other variations it only comprises an HLR module and the SM module. In yet other variations it only comprises an HLR module and the SIM OTA module. It is in all of these variations possible that also the GGSN module is included and/or that the BSS module is included and/or that the SGSN modules are included. It is furthermore possible that also SGSN1 is included.

The MSCs are typically provided as separate entities that are not part of the arrangement. However, they may in some embodiments also be included in the arrangement.

It should here be realized that the modules may be provided in several different computers communicating with each other. It is also possible that one or more of such computers comprises more than one module.

Figure 5:
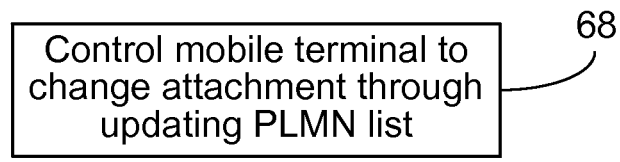
FIG. 5 shows a flow chart of a number of method steps being performed in the subscription identity changing arrangement according to a first embodiment.
Figure 6:
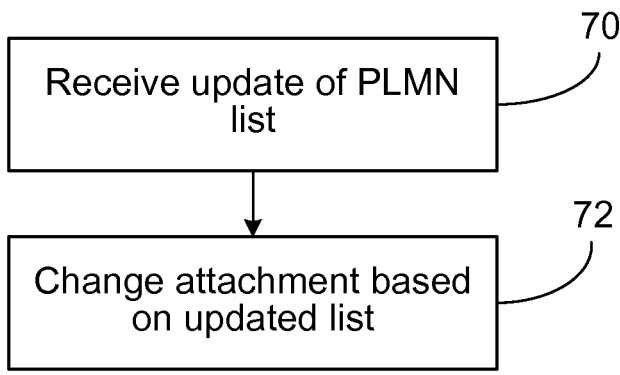
FIG. 6 shows a flow chart of number of corresponding method steps of the first embodiment being performed in the mobile terminal.

Now a first embodiment will be described with reference being made to the previously mentioned FIG. 1-4 as well as to FIG. 5, which shows a flow chart of a number of method steps being performed in the arrangement, and to FIG. 6, which shows a flow chart of number of corresponding method steps being performed in the mobile terminal.

In the following the mobile terminal 10 will be described as communicating with the core networks. In all these cases the communication will be performed using the corresponding access networks. However, this will in the following essentially be omitted in order to provide a clearer description of the various embodiments.

As is known in the art a mobile terminal needs to have a subscription or at least a subscriber identity in order to be allowed communication in a mobile communication system. The subscriber identity may for instance be used in identifying various access rights provided for the user in the mobile communication system.

The mobile terminal has received both the subscriber identities IMSI1 and IMSI2 before the method steps being described in the steps below are being carried out. Both subscriber identities are thus already provided locally in the mobile terminal, for instance being stored in the memory 60 of the smart card 12. One of the IMSIs, and in this example IMSI1 is furthermore active and being used by the mobile terminal for communicating with the corresponding mobile communication system. The other is passive and not yet in use.

It is now assumed that the user, which in this case may be a company having a number of mobile terminals in various applications, selects that a change is to be made from the first mobile communication system to the second mobile communication system. The user may for instance provide instructions to the BSS 54 about a change from the first mobile communication system to the second mobile communication system. This change will then involve a switch from using the first subscriber identity IMSI1 to using the second subscriber identity IMSI2. The arrangement therefore controls the mobile terminal in to change from being attached to the first mobile communication system to being attached to the second mobile communication system, step 68, which control is obtained through updating of a list of preferred mobile communication systems for the mobile terminal. This list may be a so-called Public Land Mobile Communication (PLMN) list. Furthermore, according to this update the second mobile communication system has a higher rank than the first mobile communication system, where the second mobile communication system may have the highest rank and the first mobile communication system may be set as being disallowed for the mobile terminal 10.

The BSS 54 may inform a suitable module of the arrangement involved in handling the changeover. This module is typically one of the common entities. The module of the arrangement that is involved in sending the changeover may be the SIM OTA 52. In other variations it is handled by a combination of HLR 50 and SIM OTA 52 or a combination of HLR 50 and SM 48. An informing module, which may be SM, SIM OTA or HLR will provide the mobile terminal with the update of the list. This may be done through the informing module contacting, either directly or indirectly via a SGSN, the access network, such as the RNC 22 of the first access network 18. The instruction to the SIM OTA may also be made by the HLR The change also involves the mobile terminal detaching from the first mobile communication system and attaching to the second mobile communication system. The detaching and attaching may be made under the supervision of an attaching control module, which may be the HLR. In order to handle this situation the attaching control module may ensure that an instruction is sent to the mobile terminal to reselect mobile communication system. The instruction may be provided as a part of a request to detach from the first mobile communication system being sent to the mobile terminal 10. The instruction may be sent using SGSN1, which would then employ the first access network 18. In one variation the instruction may be a cancel location message indicating that the subscription associated with the first subscriber identity (IMSI1) has been withdrawn together with an indication that a PLMN reselection is required.

The radio circuit 14 of the mobile terminal 10 thus receives the update of the list of preferred mobile communication systems, step 70. Such a list may be handled by the smart card 12, in which case the radio circuit may forward the update to the smart card 12, which in turn updates the list. In this way the smart card 12 may make settings in relation to mobile communication system, which settings may trigger the radio communication unit 14 to request to attach to the second mobile communication system. The radio circuit 14 thus changes attachment based on the updated list, step 72. As the second mobile communication system has a higher priority than the first mobile communication system, a PLMN selection will then lead to the second mobile communication system being selected. The radio communication unit regularly checks the list and therefore it may change attachment based on its own initiative. The radio circuit 14 may in this way change from being attached to the first mobile communication system to being attached to the second mobile communication system.

However, in order to speed up the change it is possible to provide the above mentioned reselection from a core network, which reselection may be provided together with the request to detach from the first mobile communication system. In this case the update is thus performed based on the request for re-selection.

As can be seen from what has been described above the detachment from the first mobile communication system and the attachment to the second mobile communication system is all handled through the use of the core networks. The mobile terminal may thereby always be on and do not need to be reset. This allows a swift change, without unnecessary loss of data. If for instance important messages are to be conveyed to the mobile terminal, it my be able to be aware of these in a completely different way than if having to be turned off or reset. The change over is also simple in that no manual operation of the mobile terminal is required. This also allows an operator change to be made for interrupt-sensitive services, e.g. hazard warning for automotive applications.

Figure 7:
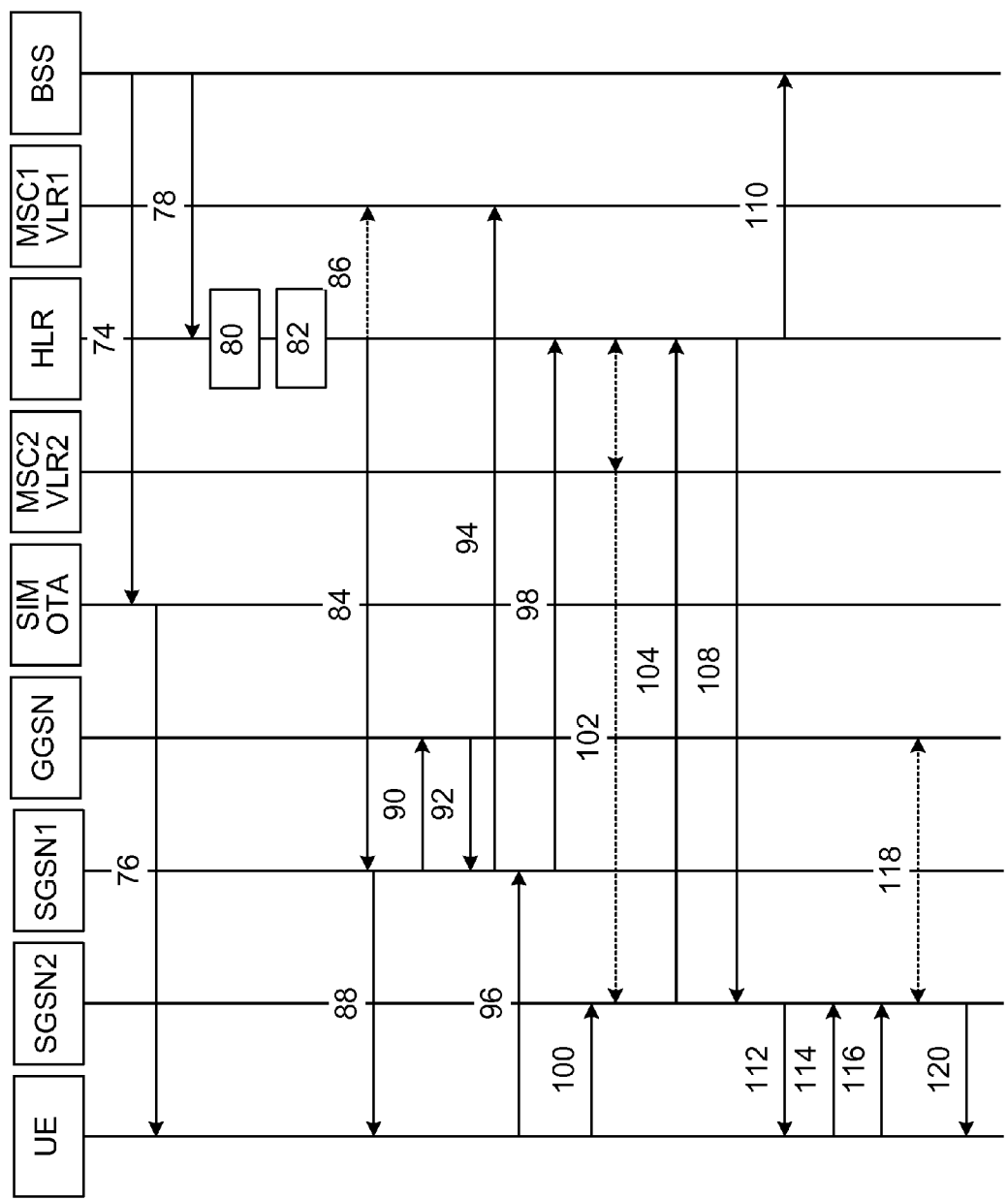
FIG. 7 shows a number of signals being exchanged between the mobile terminal and the two core networks according to a second embodiment.

Now a second embodiment will be described with reference being made to FIG. 1-4, as well as to FIG. 7, which shows a number of signals exchanged between the mobile terminal and the two core networks.

In this embodiment the informing module is still the SIM OTA 52, which updates a priority list of mobile communication systems. This list may be a list of preferred Public Land Mobile Networks (PLMN) used by the smart card 12 of the mobile terminal. It thus updates a list of preferred public land mobile networks (PLMN), i.e. mobile communication systems. This may be done through giving the operator of the second mobile communication system a higher priority than the operator of the first mobile communication system. This may be done through putting the new operator system in the top priority position of the list and the old operator system as forbidden PLMN, and then the core network (HLR and SGSN) controls the mobile terminal to conduct a detach-reattach process together with an indication that "PLMN reselection is required" in the detach-reattach process.

This may take place in the following way:

The BSS 54 may initiate the subscription change operation and notifies 74 the SIM OTA 52 to trigger a subscription change, where this notification may comprise IMS1 and IMSI2.

2. SIM OTA 52 then updates 76 the Preferred PLMN list for the mobile terminal. This may be done through making the new operator a first preferred PLMN, and the old operator as a forbidden PLMN. The SIM OTA 52 may have the list itself and make these settings in the list. As an alternative the list may be provided in the mobile terminal 10 and may more particularly be provided on the smart card 12. In this case SIM OTA 52 generates instructions to change the list, which instructions may be instructions to give the highest priority to the second mobile communication system and make the first mobile communication system a forbidden system. The update may be made through instructing the access network to send an OTA command with the changed list or instructions to change the list.

As the radio circuit 14 receives this message, it sees that it is related to PLMN selection. Therefore it forwards the message to the smart card 12.

BSS 50 also notifies 78 HLR 50 to trigger a subscription change. HLR 50, which in this case may be consider to be an attachment handling module then activates 80 the new subscription, i.e. the subscription of IMSI2, and deactivates 82 the old subscription, i.e. the subscription of IMSI1. The activation may involve the associating of IMSI2 to mobile terminal data and phone number and subscription data such as access rights and pricing. This grants the mobile terminal the use of various bearer services in the second mobile communication system such as Short Message Service (SMS), data and voice and allows the mobile terminal to participate in various signaling procedures. The deactivation may involve barring the mobile terminal from using the bearer services, and disallowing the performing of signaling procedures except for retrying to attach.

HLR 50 then initiates "Cancel Location" 84 with cancellation type as "subscription withdrawn, PLMN reselection required" towards SGSN1 32 and MSC1/VLR1 34/36. It is thus a message indicating that the mobile terminal with IMSI is not be handled by SGSN1 32 for the reason that the subscription has been withdrawn. The message therefore comprises "IMSI1" for deactivation of the subscription to the first mobile communication system. However, it also comprises an indication that the mobile terminal should make a reselection of mobile communication system using the priority list. The message 84 is sent to SGSN1 32. A cancel location message, perhaps without indication of PLMN reselection, may also be sent 86 to MSC1/VLR1 34/36. The HLR 50 thus generates a cancel location message to SGSN1 32 and MSC1/VLR1 34/36 which is a message to change the location in respect of IMSI1. However, it is also an indication that a mobile communication system reselection is to be made.

After having received the message 84, SGSN1 32 then requests 88 the mobile terminal 10 to detach from the first mobile communication system, which request is a request to stop using the mobile communication system of IMSI1. However, the message also comprises an indication that the mobile terminal has to make a reselection of mobile communication system according to the priority list.

In the network connectivity with the first mobile communication system, there exists a Packet Data Protocol (PDP) context for the mobile terminal in the first core network 30. This involves a GPRS Tunnelling protocol (GTP) tunnel between SGSN1 32 and GGSN 56. The PDP context may comprise an IP address assigned to the mobile terminal in the first mobile communication system, IMSI1, as well as Tunnel Endpoint IDs for GGSN and SGSN1.

In relation to sending the request 88 SGSN1 deactivates and deletes the existing PDP context 90 and also instructs the GGSN to make this deletion and when the GGSN also has deleted the PDP context, SGSN1 receives a response that the context has been deleted 92. SGSN1 also informs MSC1/VLR1 that there is a detachment through sending a GPRS detach indication 94 to MSC1 in respect of IMSI1. The deactivating and deleting may also involve deleting possible inserted attachment data such as IMSI1, phone number and bearer services, etc.

After having received the request to detach 88 also the radio circuit 14 of the mobile terminal 10 deactivates the PDP context and thereafter accepts the detachment through sending a Detach Accept message 96 to SGSN1. In this way the old subscription (IMSI1) of the mobile terminal 10 is detached from the SGSN1 and MSC1/VLR1.

After having deleted the PDP context and cancelled the location, SGSN1 32 acknowledges the request to cancel location 98 to HLR 50.

This means that now the mobile terminal is detached from the first mobile communication system and needs to attach to the second mobile communication system. This is in this embodiment done through the mobile terminal, after the completion of the detach procedure, entering into a PLMN selection phase.

The radio circuit 14 after having received the special detach request, therefore makes a PLMN selection that is triggered by the detach request. In this the radio circuit investigates the list in the smart card, and notes that the second mobile communication system has a higher priority than the first mobile communication system. It may even have the highest priority. Therefore the radio circuit selects the second mobile communication system and contacts it in a PLMN selection, 100, which selection also involves a cell selection 100. The PLMN selection may also involve the use of IMSI2. In this PLMN selection, the radio circuit may thus select to use a subscriber identity. The subscriber identity that is selected may be a subscriber identify for use in the attachment having a country code section corresponding to the country code of the second mobile communication system and an operator code section corresponding to an operator code of the second mobile communication system. It is known that an IMSI is made up various sections, where one section is a Mobile Country Code (MCC) section and another is a Mobile Network Code (MNC) section. The codes are used in the identifying of mobile communication systems in the PLMN list. Therefore, when the PLMN reselection is made, the radio circuit will select an IMSI having an MCC section and an MNC section with values that represent the mobile communication system with the highest priority in the list and the country of the system. The radio circuit thus selects the system with the highest priority in the list for which there is provided an IMSI. In this example this would be IMSI2 and the system in question would be the second mobile communication system.

The mobile terminal thereby triggers an attach procedure 102 to take place with the second mobile communication system using IMSI2. This attach procedure involves SGSN2 40, HLR 50 and MSC2/VLR2 42/44.

In the attach procedure, SGSN2 40 sends 104 an Update Location request to HLR 50 and HLR 50 inserts subscription data into SGSN2 as well as in MSC2/VLR2 42 and 44. When the HLR is finished with this it sends an acknowledgement Update Location Ack 108 to SGSN2 40.

After having sent the update locations acknowledgement 108, the HLR 50 sends a "change subscription response" 110 to BSS 54, which informs BSS that the subscription of the user has been changed from the first mobile communication system to the second mobile communication system After having received the update locations acknowledgement 108, SGSN2 40 sends an "Attach accept" response 112 to the mobile terminal with IMSI2.

The attach accept is received by the radio circuit 14, which may then send an "Attach complete" message 114 to SGSN2. Also this message my include IMSI2.

The radio circuit 14 of the mobile terminal 10 then sends a PDP context activation request 116 to SGSN2, whereupon SGSN2 may establish a PDP context 118 with GGSN and may in this regard set up a GPRS Tunnelling protocol (GTP) tunnel with GGSN 56. The context may then comprise endpoint identifiers of this tunnel, an IP address assigned to the mobile terminal 10 and of course also IMSI2. SGSN2 then sends back a "PDP context activation response" 120 to the mobile terminal 10, indicating that the PDP context has been set up.

The smart card may then disable the old subscription, i.e. the subscription associated with IMSI1, which may be done through setting a disabled flag associated with the IMSI. At the same time it may enable the new subscription through setting an enable flag associated with IMSI2. In this way it is ensured that only the enabled IMSI is used for future reattachment. As an alternative it is possible that the smart card deletes IMSI1 and only retains IMSI2, It can in this way be seen that the change from the first mobile communication system to the second mobile communication system is made using the two core networks and over-the air instructions The mobile terminal is thereby able to switch to the new subscription and new operator system in much shorter delay (about 10 seconds) with network controlled detach-reattach process, comparing to the "Enabling Subscription Process" in the smart card, which takes at least 30 seconds for performing execution and reset. The change is also used without actually having to relying on a subscription manager. A low number of parties need therefore be involved, which simplifies the change.

Some examples of triggers to change an operator on an smart card could be (but not restricted to) the following:
Location change
Roaming
Time (e.g. contract period)
Customer (enterprise) request It is possible that there are two GGSNs and two HLRs, one in each core network. An SGSN will then communicate with the HLR and GGSN of the own core network. In this case the BSS may act as an informing module that instructs the HLR of the first core network 30 to deactivate the old subscription and instructs the HLR of the second core network 38 to activate the new subscription. In this case the instruction to deactivate the old subscription may comprise an instruction to the HLR of the first core network 30 to send a special detach request with indication that a PLMN reselection is to be made.

It should also be realized that the disabling of a subscription may be optional. In some cases it may be of interest to keep the old subscription alive.

Figure 8:
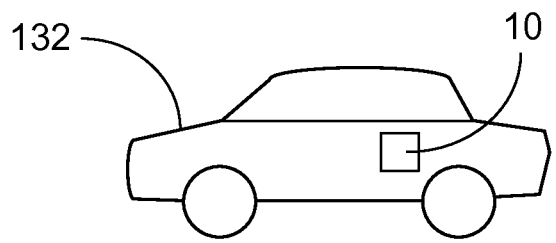
FIG. 8 shows one realization of the mobile terminal when being provided in a vehicle.

The mobile terminal may as an example also be provided in a vehicle, such as a car 132 or a truck. One such realization is shown in FIG. 8. Another possible location is in a vessel, such as a ship or an aeroplane.

The notifying module may be considered as being implemented as means for controlling a mobile terminal to change from being attached to a first mobile communication system to being attached to a second mobile communication system, where this controlling is obtained through an update of a list of preferred mobile communication systems for the mobile terminal, according to which update the second mobile communication system has a higher rank than the first mobile communication system.

The means for controlling may furthermore be considered to comprise means for giving the second mobile communication system the highest rank and set the first mobile communication system as disallowed.

The means for controlling may furthermore be considered to comprise means for instructing an over-the-air programming unit to send the update to the mobile terminal.

The means for controlling may as an alternative be considered to comprise means for sending the update to the mobile terminal.

The attachment control module may be considered as being implemented as means for ensuring a sending of an instruction to the mobile terminal to reselect mobile communication system.

The means for ensuring a sending of an instruction may be considered as being means for sending the instruction to the mobile terminal or means for instructing a unit to send the instruction to the mobile terminal.

In a similar manner the radio circuit may be considered to comprise mean for receiving, via the first mobile communication system, an update of a list of preferred mobile communication systems for the mobile terminal, according to which update a second mobile communication system has a higher rank than the first mobile communication system, and means for changing from being attached to the first mobile communication system to being attached to the second mobile communication system based on the updated list. The means for receiving may be considers as being means for receiving the update from an over-the-air programming unit.

The radio circuit may furthermore be considered as comprising means for receiving an instruction to reselect mobile communication system and means for perform the change based on the instruction.

The mobile communication systems are with advantage Wideband Code Division Multiple Access Systems (WCDMA). However, they may as an example also be GPRS systems or Long Term Evolution (LTE) systems.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A mobile communication system changing arrangement for at least one mobile communication system, said arrangement comprising:
    a processor; and
    memory, said memory containing computer instructions executable by said processor whereby said mobile communication system changing arrangement is operative to:
        control a mobile terminal to change from being attached to a first mobile communication system to being attached to a second mobile communication system, said control being obtained through an update of a list of preferred mobile communication systems for the mobile terminal, according to which the mobile terminal is to update the second mobile communication system to have a higher rank than the first mobile communication system, wherein the changing includes to deactivate subscription of a first subscriber identity to the first mobile communication system and activate subscription of a second subscriber identity to the second mobile communication system based on both (1) ranks of the first and second mobile communication systems and (2) the first and second subscriber identities, and wherein the first and second subscriber identities are to be stored in the mobile terminal that the first and second subscriber identities identify.

2. The mobile communication system changing arrangement according to claim 1, which when updating the list is operative to give the second mobile communication system the highest rank and set the first mobile communication system as disallowed.

3. The mobile communication system changing arrangement according to claim 1, which when controlling the mobile terminal is operative to instruct an over-the-air programming unit to send the update to the mobile terminal.

4. The mobile communication system changing arrangement according to claim 1, which when controlling the mobile terminal is operative to send the update to the mobile terminal.

5. The mobile communication system changing arrangement according to claim 1, being further operative to ensure a sending of an instruction to the mobile terminal to reselect mobile communication system.

6. The mobile communication system changing arrangement according to claim 5, which when being operative to ensure the sending is operative to send the instruction to the mobile terminal.

7. The mobile communication system changing arrangement according to claim 5, which when being operative to ensure the sending is operative to instruct an attachment control module to send the instruction to the mobile terminal.

8. A method for changing mobile communication system a mobile terminal is to communicate with, the method being performed in a mobile communication system changing arrangement and comprising:
    controlling a mobile terminal to change from being attached to a first mobile communication system to being attached to a second mobile communication system, said control being obtained through updating of a list of preferred mobile communication systems for the mobile terminal, according to which the mobile terminal updates the second mobile communication system to have a higher rank than the first mobile communication system, wherein the changing includes deactivating subscription of a first subscriber identity to the first mobile communication system and activating subscription of a second subscriber identity to the second mobile communication system based on both (1) ranks of the first and second mobile communication system and (2) the first and second subscriber identities, and wherein the first and second subscriber identities are to be stored in the mobile terminal that the first and second subscriber identities identify.

9. The method according to claim 8, wherein the updating comprises giving the second mobile communication system the highest rank and setting the first mobile communication system as disallowed.

10. The method according to claim 8, wherein the controlling comprises instructing an over-the-air programming unit to send the update to the mobile terminal.

11. The method according to claim 8, wherein the controlling comprises sending the update to the mobile terminal.

12. The method according to claim 8, further comprising ensuring a sending of an instruction to the mobile terminal to reselect mobile communication system.

13. The method according to claim 12, wherein the ensuring of the sending comprises sending the instruction to the mobile terminal.

14. The method according to claim 12, wherein the ensuring of the sending comprises instructing an attachment control module to send the instruction to the mobile terminal.

15. A mobile terminal for communication with at least one mobile communication system, said mobile terminal comprising:
    a radio circuit for communicating with a first and a second mobile communication system and configured to:
        receive via the first mobile communication system, an update of a list of preferred mobile communication systems for the mobile terminal, according to which the mobile terminal is to update a second mobile communication system to have a higher rank than the first mobile communication system, and change from being attached to the first mobile communication system to being attached to the second mobile communication system based on the updated list, wherein the changing includes to deactivate subscription of a first subscriber identity to the first mobile communication system and activate subscription of a second subscriber identity to the second mobile communication system based on both (1) ranks of the first and second mobile communication systems and (2) the first and second subscriber identities, and wherein the first and second subscriber identities are to be stored in the mobile terminal that the first and second subscriber identities identify.

16. The mobile terminal according to claim 15, wherein the second mobile communication system has the highest rank and the first mobile communication system is disallowed in the updated list.

17. The mobile terminal according to claim 15, wherein the radio circuit is configured to receive the update from an over-the-air programming unit.

18. The mobile terminal according to claim 15, the radio circuit being further configured to receive an instruction to reselect mobile communication system and perform said change based on the instruction.

19. The mobile terminal according to claim 18, wherein the instruction is received in a request to detach from the first mobile communication system.

20. The mobile terminal according to claim 15, being provided in a vehicle.

21. A method of changing communication from a first mobile communication system to a second mobile communication system, the method being performed in a mobile terminal and comprising:

receiving, via an access network, an update of a list of preferred mobile communication systems for the mobile terminal from a mobile communication system changing arrangement, according to which the mobile terminal is to update a second mobile communication system to have a higher rank than the first mobile communication system; and changing from being attached to the first mobile communication system to being attached to the second mobile communication system based on the updated list, wherein the changing includes to deactivating subscription of a first subscriber identity to the first mobile communication system and activating subscription of a second subscriber identity to the second mobile communication system based on both (1) ranks of the first and second mobile communication systems and (2) the first and second subscriber identities, and wherein the first and second subscriber identities are to be stored in the mobile terminal that the first and second subscriber identities identify.

22. The method according to claim 21, wherein the second mobile communication system has the highest rank and the first mobile communication system is disallowed in the updated list.

23. The method according to claim 21, wherein the update is received from an over-the-air programming unit.

24. The method according to claim 21, further comprising receiving an instruction to reselect mobile communication system, wherein said change is performed based on the instruction.

25. The method according to claim 24, wherein the instruction is received in a request to detach from the first mobile communication system.

* * * * *

UNITED STATES PATENT AND TRADEMARK OFFICE
CERTIFICATE OF CORRECTION

PATENT NO. : 9,294,909 B2  
APPLICATION NO. : 14/114364  
DATED : March 22, 2016  
INVENTOR(S) : Li et al.

Page 1 of 1

It is certified that error appears in the above-identified patent and that said Letters Patent is hereby corrected as shown below:

In the specification

In Column 1, Line 65, delete "the" and insert -- The --, therefor.

In Column 1, Line 66, delete "the mobile" and insert -- The mobile --, therefor.

In Column 5, Line 44, delete "FIG. 1-4" and insert -- FIGS. 1-4 --, therefor.

In Column 6, Line 14, delete "terminal in" and insert -- terminal 10 --, therefor.

In Column 6, Line 38, delete "HLR" and insert -- HLR. --, therefor.

In Column 7, Line 21, delete "my be" and insert -- may be --, therefor.

In Column 7, Line 28, delete "FIG. 1-4," and insert -- FIGS. 1-4, --, therefor.

In Column 7, Line 49, delete "IMS1" and insert -- IMSI1 --, therefor.

In Column 10, Line 6, delete "IMSI2," and insert -- IMSI2. --, therefor.

In Column 10, Lines 19-20, delete "an smart" and insert -- a smart --, therefor.

In Column 10, Line 24, delete "request" and insert -- request. --, therefor.

In the claims

In Column 14, Line 11, in Claim 21, delete "deactivating" and insert -- deactivate --, therefor.

Signed and Sealed this  
Thirty-first Day of May, 2016

Michelle K. Lee  
*Director of the United States Patent and Trademark Office*